M. H. REINEKING.
CHEESE HOOP.
APPLICATION FILED DEC. 28, 1918.
1,305,410.
Patented June 3, 1919.
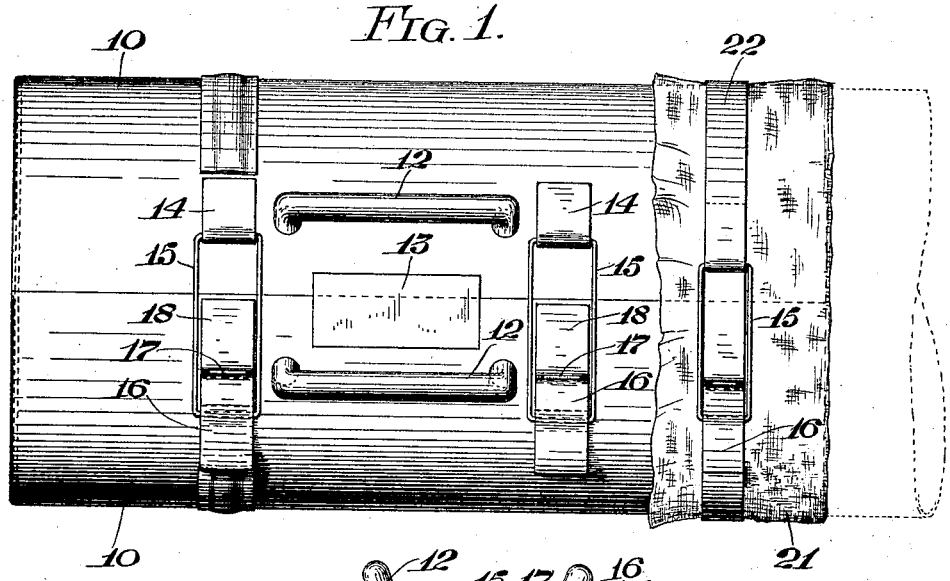
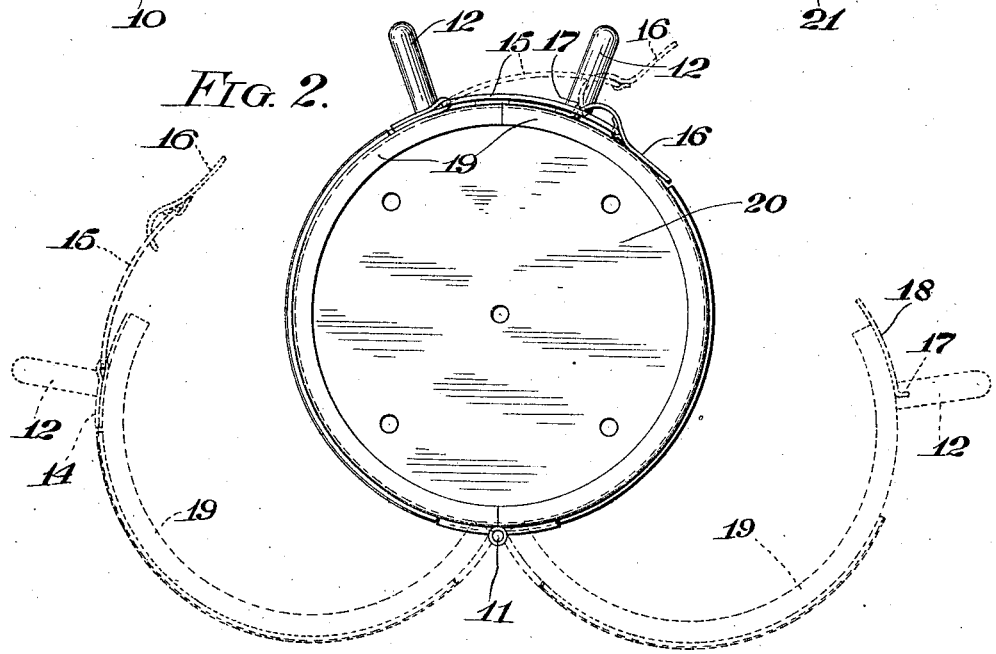
WITNESSES.
C. L. Waal.
H. D. Chase
INVENTOR
Marcus H. Reineking
By R. S. Caldwell
ATTORNEY.

UNITED STATES PATENT OFFICE.

MARCUS H. REINEKING, OF SHEBOYGAN COUNTY, WISCONSIN.

CHEESE-HOOP.

1,305,410. Specification of Letters Patent. Patented June 3, 1919.

Application filed December 28, 1918. Serial No. 268,754.

*To all whom it may concern:*

Be it known that I, MARCUS H. REINEKING, a citizen of the United States, and resident of Sheboygan county, State of Wisconsin, have invented new and useful Improvements in Cheese-Hoops, of which the following is a description, reference being had to the accompanying drawings, which are a part of this specification.

This invention has for its object to provide a cheese hoop for forming small cheese capable of standing without the usual cheese cloth bandage.

Another object of the invention is to provide a cheese hoop which is formed in sections hinged together and bound by lever acting clamping means to securely hold the parts together under the pressure to which they are subjected.

Another object of the invention is to provide such a cheese hoop with a removable end consisting of a perforated disk which is capable of movement within the cylindrical walls of the cheese hoop but which is retained by a flange at the end of the cylindrical walls.

Another object of the invention is to provide a separable cheese hoop with sections having handles both of which may be grasped at the same time for moving the hoop and which may serve as a convenient means for opening and closing the hoop.

Another object of the invention is to provide a cheese hoop of this type with a means for securing a press cloth thereto which may be stripped from the cheese when removed from the press.

With the above and other objects in view the invention consists of the cheese hoop as herein claimed and all equivalents.

Referring to the accompanying drawings in which like characters of reference indicate the same parts in the different views:

Figure 1 is a side view of a cheese hoop constructed in accordance with this invention; and, Fig. 2 is an end view thereof showing in dotted lines the position of the sections when opened.

In these drawings 10 indicates a pair of semi-cylindrical hoop sections connected together at one edge by hinges 11 and each carrying near the other edge a projecting looped handle member 12. Between the handles 12 an overlapping lip 13 is secured to one section and projects beyond the edge thereof so as to overlap the edge of the other section.

One hoop section has rigidly secured to it on either side of its handle member 12 a bearing plate 14 in which is pivotally mounted a wire loop 15 carrying a pivotally mounted hook-shaped lever 16 at its end. These levers are adapted to engage their hooked ends against outwardly bent flanges 17 of plates 18 rigidly secured to the other hoop section so that the hoop sections are thus securely clamped together. The levers 16 may be used for drawing the hoop sections together for with their hooked ends engaged with the flanges 17, in the manner shown in dotted line in Fig. 2, they may be swung toward the center of the hoop, thus forcing the hoop sections together and, when the line connecting the pivotal points of the loop 15 passes beyond the point of engagement of the lever with the flange, the spring action of the curved wire loop 15 serves to hold the levers with spring pressure in their closed position.

A flange 19 is formed at one end of the hoop by bending up the edges of both of the hoop sections and within the hoop and against this flange is seated a perforated metal disk 20.

At the other end of the cheese hoop, which is made slightly flaring so as to permit the disk end of another hoop to telescope therein, a cheese cloth 21 is secured by means of a metal strap 22 with its ends connected together by clamping means identical with those described for the hoop sections, the parts of which are indicated by the same reference characters.

When the hoop is closed and latched, the cloth 21 is arranged therein so as to cover the side walls and the bottom wall formed by the disk 20 and then the edge of the cloth is folded over the end of the cheese hoop and is clamped in place by the strap 22. The hoop may now be filled and covered with a cloth, with another disk 20 on top of it, and the hoop is ready to be placed in the press. In the press the disk 20 at the top of one cheese hoop is spaced from the disk at the bottom of the next cheese hoop by means of a wooden block, but the end of one hoop fits within the flaring end of the other hoop with sufficient clearance to permit the expressed liquid to pass out. The telescoping relation of the hoops enables the contents to be subjected to the full pressure of the press notwithstanding the shrinking that takes place, and the clamping means for the hoop sections resists the tendency of the hoop to expand under pressure.

When the pressure is removed the hoops are withdrawn from the press and are opened by first releasing the lever of the metal strap 22 and then the levers of the hoop clamps. The sections may then be forced apart by means of the handles 12 so that the cheese can be removed. If it is desired the cloth may remain on the cheese as usual but it is preferred to strip it therefrom as the cheese is of such a size as to be able to stand without the support of the bandage. The cheese with the cloth stripped therefrom has the appearance of a bandaged cheese because of the imprint of the cloth in the surface of the cheese.

The cheese hoop of this invention is strong and durable and easily cleaned.

What I claim as new and desire to secure by Letters Patent is:

In a cheese hoop a pair of semi-cylindrical sections hinged together at one edge and clamped together at the other edge, a flange at one end of the cheese hoop sections, a disk seated within the cheese hoop against said flange, the other end of the cheese hoop being flaring to receive the disk end of a similar cheese hoop, a cloth arranged within the cheese hoop to form a lining therefor and having its edge turned over the open end of the cheese hoop, and a clamping band surrounding the edge of the cloth and the flaring end of the cheese hoop.

In testimony whereof I affix my signature in presence of two witnesses.

MARCUS H. REINEKING.

Witnesses:
HENRY A. DETLING,
HENRY O. KALK.

Copies of this patent may be obtained for five cents each, by addressing the "Commissioner of Patents, Washington, D. C."